(12) United States Patent
Alber et al.

(10) Patent No.: US 10,513,332 B2
(45) Date of Patent: Dec. 24, 2019

(54) TILTWING AIRCRAFT

(71) Applicant: Sikorsky Aircraft Corporation, Stratford, CT (US)

(72) Inventors: Mark R. Alber, Milford, CT (US); Jeffrey Parkhurst, Meriden, CT (US); Charles Gayagoy, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 431 days.

(21) Appl. No.: 15/285,263

(22) Filed: Oct. 4, 2016

(65) Prior Publication Data

US 2017/0297698 A1    Oct. 19, 2017

Related U.S. Application Data

(60) Provisional application No. 62/237,282, filed on Oct. 5, 2015.

(51) Int. Cl.
| | |
|---|---|
| *B64C 3/56* | (2006.01) |
| *B64C 11/28* | (2006.01) |
| *B64C 5/10* | (2006.01) |
| *B64C 5/12* | (2006.01) |
| *B64C 39/04* | (2006.01) |
| *B64C 29/00* | (2006.01) |
| *B64D 35/00* | (2006.01) |
| *B64D 33/04* | (2006.01) |
| *B64C 1/06* | (2006.01) |
| *B64C 3/38* | (2006.01) |

(52) U.S. Cl.
CPC .......... *B64C 29/0033* (2013.01); *B64C 1/063* (2013.01); *B64C 3/56* (2013.01); *B64C 5/10* (2013.01); *B64C 5/12* (2013.01); *B64C 11/28* (2013.01); *B64C 39/04* (2013.01); *B64D 33/04* (2013.01); *B64D 35/00* (2013.01); *B64C 3/385* (2013.01)

(58) Field of Classification Search
CPC .. B64C 1/30; B64C 1/063; B64C 3/56; B64C 11/28; B64C 27/20; B64C 27/50; B64C 29/0033; B64C 39/04; B64C 5/10
See application file for complete search history.

(56) References Cited

U.S. PATENT DOCUMENTS

| | | | | |
|---|---|---|---|---|
| 2,230,370 A | * | 2/1941 | Baynes ............... | B64C 29/0033 244/56 |
| 2,621,001 A | * | 12/1952 | Roman ............... | B64C 29/0033 244/12.4 |
| 2,708,081 A | * | 5/1955 | Dobson ............... | B64C 29/0033 244/7 C |
| 3,173,629 A | * | 3/1965 | Uhor ...................... | B64C 29/00 244/4 A |
| 3,430,894 A | * | 3/1969 | Levinsky ............... | B64C 3/385 244/211 |

(Continued)

*Primary Examiner* — Richard R. Green
(74) *Attorney, Agent, or Firm* — Cantor Colburn LLP

(57) ABSTRACT

An aircraft includes a fuselage defining an aircraft attitude axis. The fuselage houses an engine fixed relative to the aircraft attitude axis. A rotor assembly is operatively connected to rotate back and forth relative to the aircraft attitude axis from a first position predominately for lift to a second position predominately for thrust. The rotor assembly includes a rotor that is operatively connected to be driven by the engine.

15 Claims, 5 Drawing Sheets

(56) References Cited

U.S. PATENT DOCUMENTS

| | | | | |
|---|---|---|---|---|
| 3,666,209 A * | 5/1972 | Taylor | B64C 29/0033 | 244/12.4 |
| 4,538,779 A * | 9/1985 | Goldstein | B64C 5/10 | 244/225 |
| 4,691,878 A * | 9/1987 | Vaughan | B64C 3/56 | 244/49 |
| 5,042,746 A * | 8/1991 | Sully | B64C 15/02 | 239/265.27 |
| 5,201,479 A * | 4/1993 | Renzelmann | B64C 3/56 | 244/49 |
| 5,395,073 A * | 3/1995 | Rutan | B64C 3/385 | 244/38 |
| 5,765,783 A * | 6/1998 | Albion | B64C 29/02 | 244/17.23 |
| 5,868,351 A * | 2/1999 | Stamps | B64C 27/50 | 244/12.4 |
| 6,367,736 B1 * | 4/2002 | Pancotti | B64C 29/0033 | 244/48 |
| 6,978,970 B2 * | 12/2005 | Purcell, Jr. | B64C 3/56 | 244/49 |
| 8,016,226 B1 | 9/2011 | Wood | | |
| 8,322,647 B2 | 12/2012 | Amraly et al. | | |
| 8,342,441 B2 | 1/2013 | Yoeli | | |
| 8,544,787 B2 * | 10/2013 | Lee | B64C 29/0033 | 244/12.4 |
| 8,960,591 B2 * | 2/2015 | Pancotti | B64C 29/0033 | 244/56 |
| 9,932,105 B2 * | 4/2018 | Maltinti | B64C 1/30 | |
| 2003/0080243 A1 * | 5/2003 | Hoisignton | B60V 1/08 | 244/13 |
| 2007/0120008 A1 * | 5/2007 | Conner | B64D 27/20 | 244/53 B |
| 2010/0230547 A1 * | 9/2010 | Tayman | B64C 27/24 | 244/7 C |
| 2012/0211608 A1 * | 8/2012 | Pancotti | B64C 29/0033 | 244/7 C |
| 2013/0026302 A1 * | 1/2013 | Lee | B64C 3/385 | 244/7 R |
| 2013/0099065 A1 * | 4/2013 | Stuhlberger | B64C 29/0033 | 244/7 C |
| 2013/0206921 A1 * | 8/2013 | Paduano | B64C 13/16 | 244/7 C |
| 2014/0061392 A1 * | 3/2014 | Karem | B64C 29/0033 | 244/7 R |
| 2014/0263854 A1 | 9/2014 | Ross et al. | | |
| 2015/0266571 A1 * | 9/2015 | Bevirt | B64D 27/24 | 244/7 C |
| 2015/0274288 A1 * | 10/2015 | Scott | B64C 27/22 | 244/7 C |
| 2015/0274290 A1 * | 10/2015 | Fenny | B64C 27/50 | 244/17.25 |
| 2016/0031555 A1 * | 2/2016 | Bevirt | B64C 11/28 | 244/7 C |
| 2018/0251227 A1 * | 9/2018 | Ross | B64C 7/02 | |

\* cited by examiner

TILTWING AIRCRAFT

BACKGROUND OF THE INVENTION

1. Field of the Invention

The present disclosure relates to aircraft, and more particularly to tiltwing aircraft such as used in in vertical and/or short take-off and landing (V/STOL) applications.

2. Description of Related Art

Tiltrotor aircraft, such as the Bell-Boeing V-22 Osprey, include rotors which can be rotated from a vertical orientation for hovering to a horizontal orientation for forward flight. Similarly, tiltwing aircraft such as the Canadair CL-84 Dynavert include wings with rotors mounted thereto where the entire wing with engines and rotors rotates between the vertical and horizontal positions. Tiltrotor aircraft have an advantage over tiltwing aircraft in that the angle of attack of the stationary wing is advantageous when hovering in a cross-wind. Tiltwing aircraft have an advantage over tiltrotor aircraft in that having the wing always aligned with the rotors improves hover efficiency, whereas tiltrotor aircraft loose rotor efficiency in hover due to the prop wash being incident on the broad side of the wings. Both tiltwing and tiltrotor aircraft enjoy speed and range advantages over conventional helicopters, and still provide for hovering as well as vertical and/or short take-off and landing.

Such conventional methods and systems have generally been considered satisfactory for their intended purpose. However, there is still a need in the art for improved tiltwing and tiltrotor aircraft. The present disclosure provides a solution for this need.

SUMMARY OF THE INVENTION

An aircraft includes a fuselage defining an aircraft attitude axis. The fuselage houses an engine fixed relative to the aircraft attitude axis. A rotor assembly is operatively connected to rotate back and forth relative to the aircraft attitude axis from a first position predominately for lift to a second position predominately for thrust. The rotor assembly includes a rotor that is operatively connected to be driven by the engine.

A second rotor assembly can be operatively connected to rotate back and forth relative to the aircraft attitude axis from first position predominately for lift and a second position predominately for thrust, wherein the second rotor assembly is opposite the first rotor assembly across the fuselage. The fuselage can house a second engine, wherein the second rotor assembly includes a rotor that is operatively connected to be driven by the second engine. A respective cross shaft can operatively connect each rotor to a respective engine for driving the respective rotor. Each cross shaft can be operatively connected to a respective engine by way of a respective transmission that receives rotational power from the respective engine along a transmission axis substantially parallel with the aircraft attitude axis and outputs rotational power to the respective cross shaft along a cross-shaft axis substantially perpendicular to the aircraft attitude axis. For example, there can be two engines, two respective cross-shafts, two respective rotor assemblies, and two respective transmissions, wherein the transmissions are connected to each other by a third cross shaft for single engine operation of both of the first and second rotor assemblies.

In another aspect, a wing can be operatively associated with each rotor assembly, wherein the wing is operatively connected to the fuselage for rotation in common with the respective rotor assembly relative to the fuselage. A pivot can connect each wing to the fuselage, wherein the pivot is concentric with the respective cross shaft of the respective rotor assembly. Each of the respective cross-shafts can pass through the respective pivot. A wing tip can be mounted to each rotor assembly opposite the fuselage, wherein the wing tip is mounted to the respective rotor assembly for rotation in common therewith relative to the fuselage.

Each rotor assembly includes a plurality of rotor blades articulated for full cyclic and collective rotor control. Empennage can extend aft from the fuselage, wherein each engine is operatively connected to issue engine exhaust through an exhaust system in the empennage such that the empennage shields the exhaust system from line of sight exterior of the aircraft.

It is contemplated that each wing tip as described above can be hingedly mounted to the respective rotor assembly for folding the wing tip for storage of the aircraft. For each rotor, at least one of the rotor blades can include a folding mechanism for folding the at least one of the rotor blades for storage of the aircraft. It is also contemplated that the empennage as described above can be hingedly connected to the fuselage for folding the empennage for storage of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
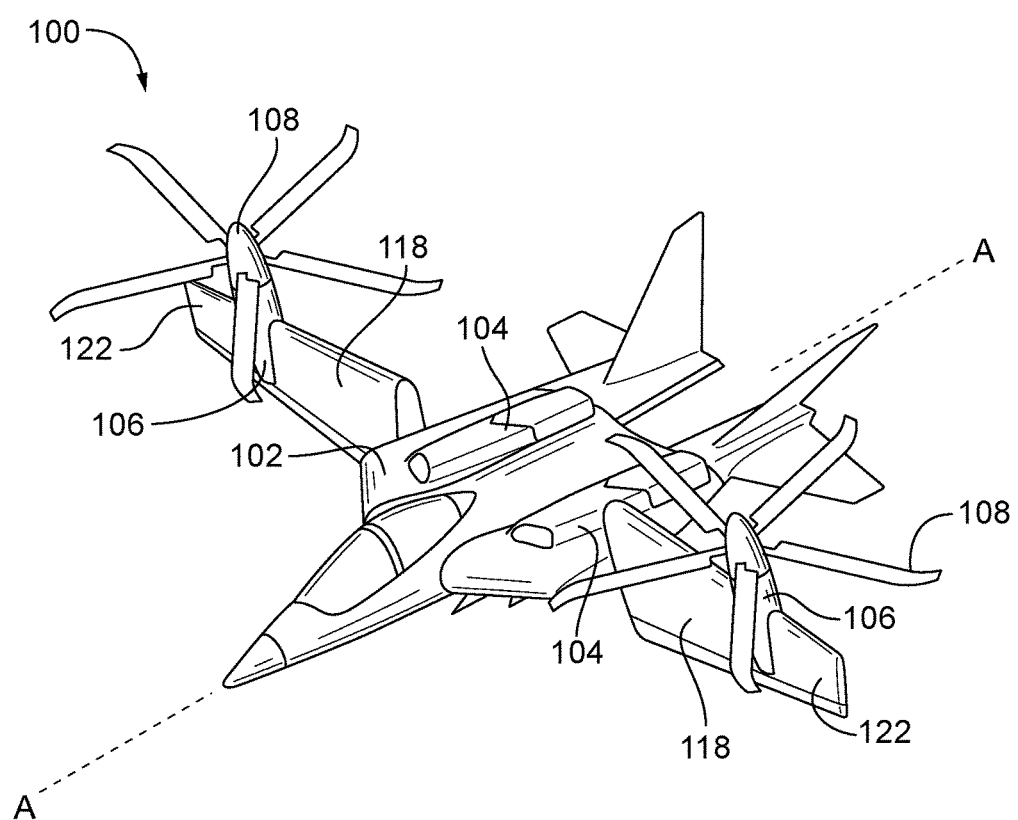
FIG. 1 is a perspective view of an exemplary embodiment of an aircraft constructed in accordance with the present disclosure, showing the tilt wings in vertical and/or short take-off and landing (V/STOL) mode.

Reference will now be made to the drawings wherein like reference numerals identify similar structural features or aspects of the subject disclosure. For purposes of explanation and illustration, and not limitation, a partial view of an exemplary embodiment of an aircraft in accordance with the disclosure is shown in FIG. 1 and is designated generally by reference character 100. Other embodiments of an aircraft in accordance with the disclosure, or aspects thereof, are provided in FIGS. 2-5, as will be described. The systems and methods described herein can be used for vertical and/or short take-off and landing (V/STOL) aircraft.

Figure 2:
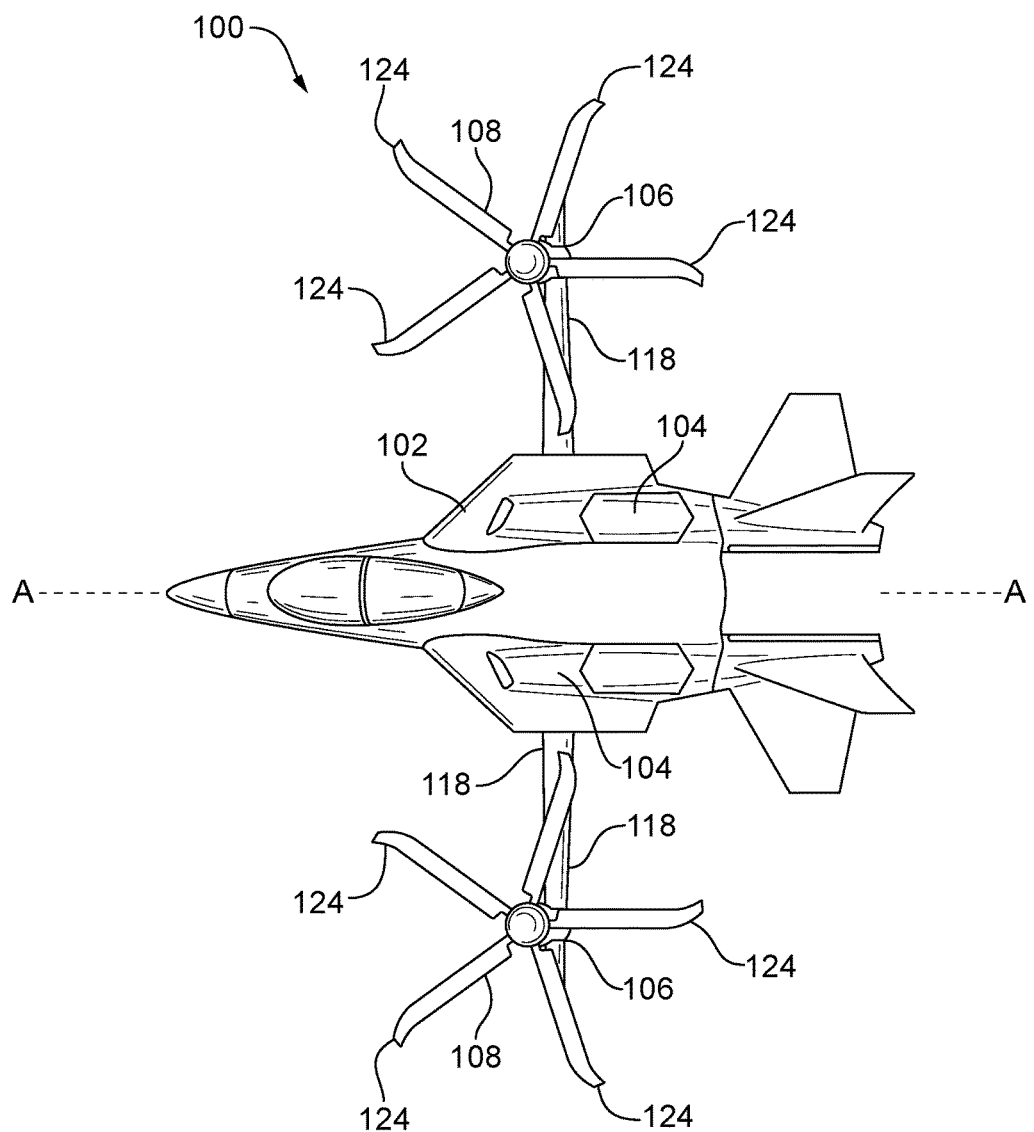
FIG. 2 is a plan view of the aircraft of FIG. 1, showing the rotor assemblies.

Aircraft 100 includes a fuselage 102 defining an aircraft attitude axis A. Fuselage 102 houses a pair of engines 104 that are fixed relative to the aircraft attitude axis A. A pair of rotor assemblies 106 opposed to one another across fuselage 102 is included, each operatively connected to rotate back and forth relative to the aircraft attitude axis A from a first position predominately for lift or V/STOL mode as shown in FIGS. 1 and 2, to a second position predominately for thrust or forward flight mode as shown in FIG. 3.

Figure 3:
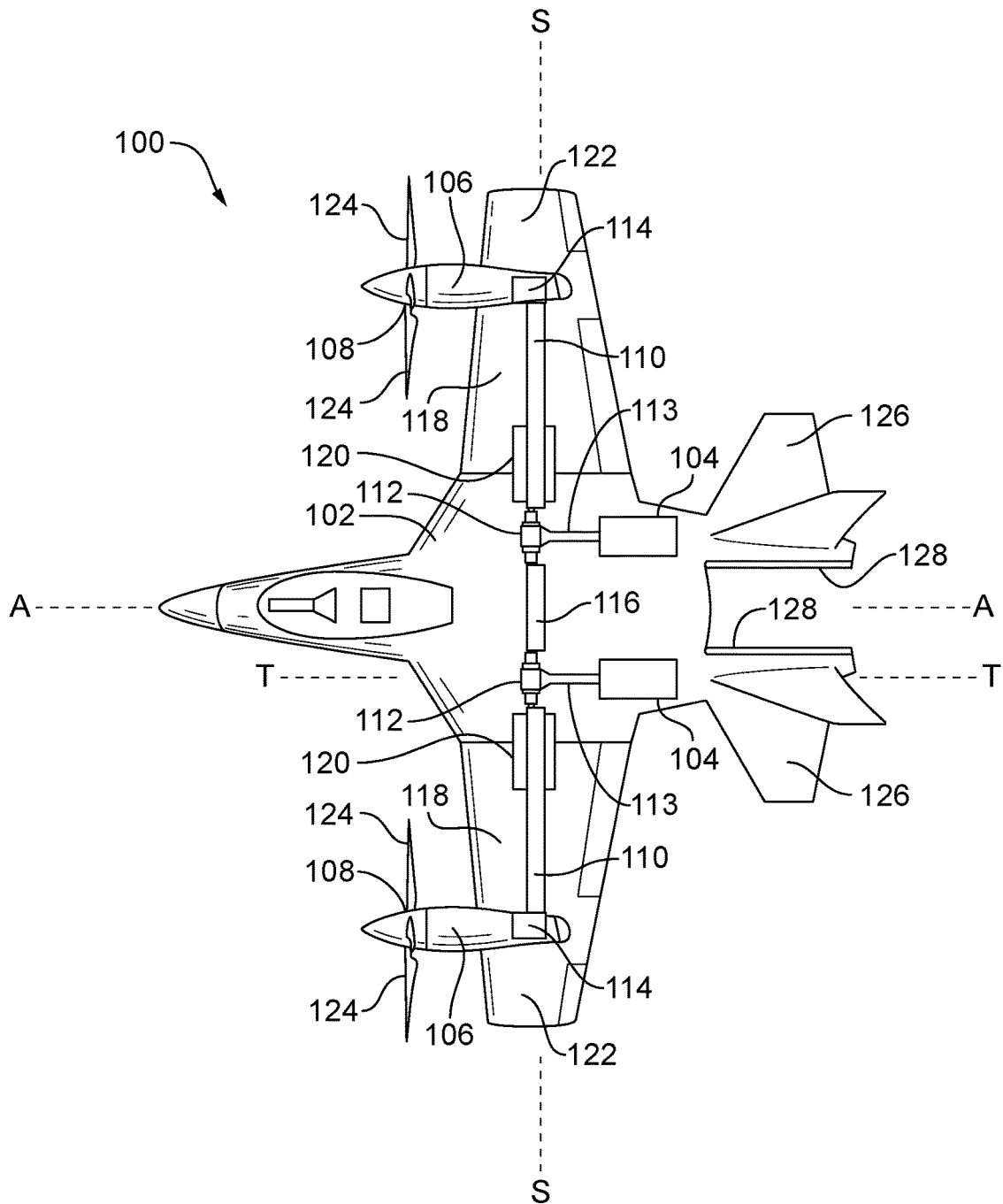
FIG. 3 is a partially schematic plan view of the aircraft of FIG. 1 in forward flight mode, schematically showing the power transmission connecting the engines to the rotor assemblies.

With reference now to FIG. 3, rotor assemblies 106 each include a rotor 108 that is operatively connected to be driven by the respective engine 104. A respective cross shaft 110 operatively connects each rotor 108 to a respective engine 104 for driving the respective rotor 108. Each cross shaft 110 is operatively connected to a respective engine 104 by way of a respective transmission 112 that receives rotational power from the respective engine 104 through respective shafts 113 that extend along a transmission axis T substantially parallel with the aircraft attitude axis A and outputs rotational power to the respective cross shaft 110 along a cross-shaft axis S substantially perpendicular to the aircraft attitude axis A. Another transmission 114 is included in each rotor assembly 106 to transmit rotational power from the respective cross shaft 110 to the respective rotor 108. Transmissions 112 are connected to each other by a third cross shaft 116 for single engine operation of both of the rotor assemblies 106. Single engine operation can be advantageous in various applications, including fuel economy cruising, endurance, and for redundancy in the event one engine needs to be powered down.

Aircraft 100 is a tiltwing aircraft. Each of the wings 118 is operatively associated with a respective one of the rotor assemblies 106, wherein the wing 118 is operatively connected to fuselage 102 for rotation in common with the respective rotor assembly 106 relative to the fuselage 102 and aircraft attitude axis A. A pivot 120 connects each wing 118 to fuselage 102, wherein the pivot 120 is concentric with the respective cross shaft 110 of the respective rotor assembly 106. Each of the respective cross shafts 110 passes through the respective pivot 120, however, those skilled in the art will readily appreciate that this could optionally be reversed. Actuation of the wing/rotor assembly rotation relative to aircraft attitude axis A can be accomplished by any suitable actuator operatively connected to each pivot 120. A wing tip 122 is mounted to each rotor assembly 106 opposite fuselage 102, wherein the wing tip 122 is mounted to the respective rotor assembly 106 for rotation in common therewith relative to the fuselage 102.

Each rotor assembly 106 includes a plurality of rotor blades 124 articulated for full cyclic and collective rotor control. Empennage 126 extends aft from fuselage 102, wherein each engine 104 is operatively connected to issue engine exhaust through an exhaust system 128 in the empennage 126 such that the empennage 126 shields exhaust system 128 from line of sight exterior of aircraft 100.

Figure 4:
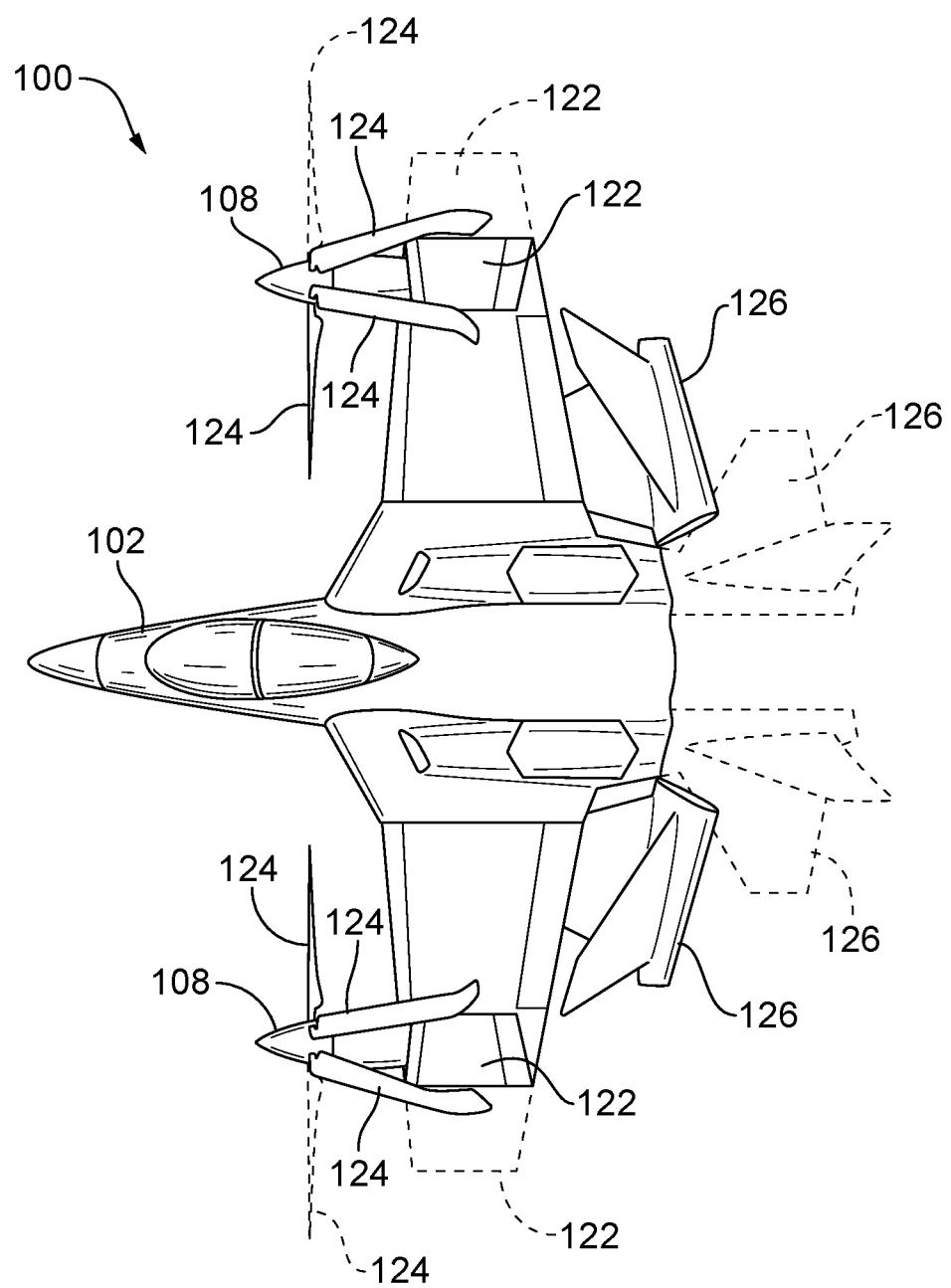
FIG. 4 is a plan view of the aircraft of FIG. 1, showing the aircraft in storage mode.

With reference now to FIG. 4, each wing tip 122 is hingedly mounted to the respective rotor assembly 106 for folding the wing tip, e.g., for storage of aircraft 100. For each rotor 108, at least one of the rotor blades 124 can include a folding mechanism for folding the same for storage of the aircraft. In the example shown in FIG. 4, one rotor blade 124 of each rotor 108 is left unfolded. It is also contemplated that the empennage 126 can be hingedly connected to fuselage 102 for folding the empennage 126 for storage of the aircraft. In FIG. 4, the unstowed positions for wing tips 122, rotor blades 124, and empennage 126 are shown in dashed lines.

Figure 5:
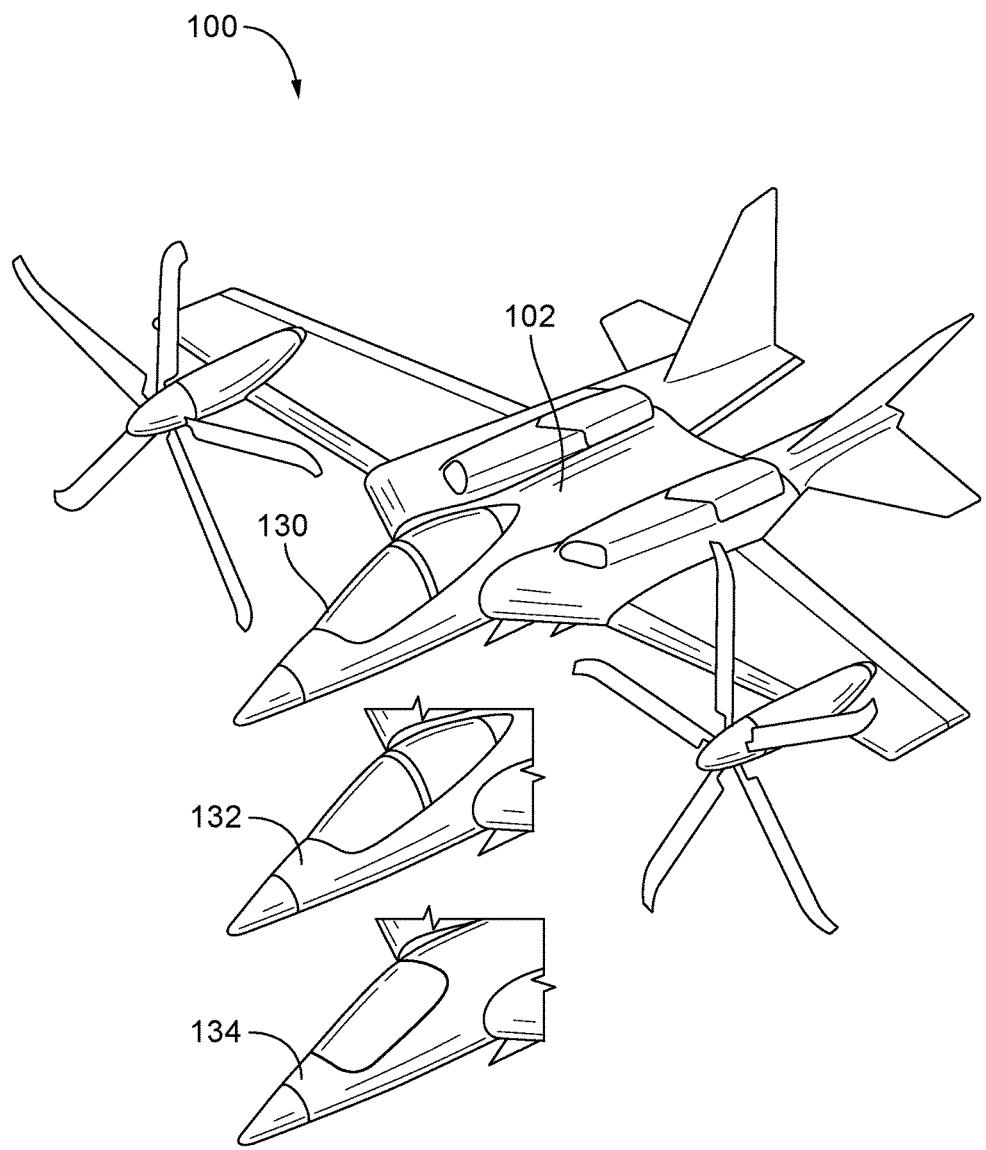
FIG. 5 is a perspective view of the aircraft of FIG. 1, showing optional fuselage configurations.

Referring now to FIG. 5, it is contemplated that fuselage 102 can be configured for various missions/applications. For example, fuselage 102 can include a two-seat cockpit 130, however it is also contemplated that a single seat cockpit 132 can be used, or even an unmanned air vehicle (UAV) system 134 can be used.

Since the engines 104 do not have to rotate to change from hover to forward flight, the engines 104 do not have to be specially designed to handle rotation as in conventional tiltwing and tiltrotor aircraft. In conventional tiltwing and tiltrotor aircraft, the engines have to be specially designed to handle rotation to the vertical position, which tends to upset fluid systems such as sumps and the like that are typical in main stream engines. This has traditionally been a design limitation on tiltwing and tiltrotor aircraft—designers were limited to what engine models could be used in such aircraft. With the systems and methods disclosed herein, any suitable engine can be used without necessarily requiring capability of operation in the vertical position.

Those skilled in the art will readily appreciate that while described herein in the exemplary context of having two engines, aircraft can have any suitable number of engines, including single engine configurations, without departing from the scope of this disclosure. Mounting the engine within the fuselage eliminates the need for a wide-engine attitude capability. Engine power can be transmitted to the prop-rotor via gearboxes and cross shafts. The engine, inlet, and exhaust system to not need to articulate, offering design and operational benefits. For example, the engine exhaust system can be designed for a more stringent level of survivability requirements. A level body attitude allows the fuselage to contain personnel and crew.

The methods and systems of the present disclosure, as described above and shown in the drawings, provide for tiltwing aircraft with superior properties including maintaining of the engines in a substantially horizontal aspect regardless of the rotor assembly aspect. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft comprising:
a fuselage defining an aircraft attitude axis and housing an engine fixed relative to the aircraft attitude axis;
a first empennage extending from the fuselage, the first empennage being hingedly mounted to the fuselage and including a first exhaust system connected to the engine;
a second empennage extending from the fuselage, the second empennage being hingedly mounted to the fuselage independent of the first empennage and including a second exhaust system connected to the engine, the first and second empennages pivotable to reduce a length of the aircraft; and
a rotor assembly operatively connected to rotate back and forth relative to the aircraft attitude axis from a first position predominately for lift to a second position predominately for thrust, wherein the rotor assembly includes a rotor that is operatively connected to be driven by the engine, the rotor assembly including a plurality of rotor blades articulated so as to be operable for cyclic and collective rotor control.

2. The aircraft recited in claim 1, wherein the rotor assembly is a first rotor assembly and further comprising:
a second rotor assembly operatively connected to rotate back and forth relative to the aircraft attitude axis from first position predominately for lift and a second position predominately for thrust, wherein the second rotor assembly is opposite the first rotor assembly across the fuselage.

3. The aircraft as recited in claim 2, wherein the engine is a first engine wherein the fuselage houses a second engine, and wherein the second rotor assembly includes a rotor that is operatively connected to be driven by the second engine.

4. The aircraft as recited in claim 3, further comprising:
a cross shaft operatively connecting the rotor assembly and the engine and second cross shaft operatively connecting the second rotor assembly to the second engine.

5. The aircraft as recited in claim 4, wherein each cross shaft is operatively connected to a respective engine by way of a respective transmission that receives rotational power from the respective engine along a transmission axis substantially parallel with the aircraft attitude axis and outputs rotational power to the respective cross shaft along a cross-shaft axis substantially perpendicular to the aircraft attitude axis.

6. The aircraft as recited in claim 5, wherein the transmissions are connected to each other by a third cross shaft for single engine operation of both of the first and second rotor assemblies.

7. The aircraft as recited in claim 2, further comprising:
a wing operatively associated with corresponding ones of the rotor assembly and the second rotor assembly, wherein the wing is operatively connected to the fuselage for rotation in common with the respective rotor assembly relative to the fuselage.

8. The aircraft as recited in claim 7, wherein a pivot connects each wing to the fuselage, wherein the pivot is concentric with the respective cross shaft of the respective rotor assembly.

9. The aircraft as recited in claim 8, wherein each of the respective cross shaft passes through the respective pivot.

10. The aircraft as recited in claim 2, further comprising:
a wing tip mounted to corresponding ones of the rotor assembly and the second rotor assembly opposite the fuselage, wherein the wing tip is mounted to the respective rotor assembly for rotation in common therewith relative to the fuselage.

11. The aircraft as recited in claim 10, wherein each wing tip is hingedly mounted to the respective rotor assembly for folding the wing tip for storage of the aircraft.

12. The aircraft as recited in claim 2, wherein each of the rotor assembly and the second rotor assembly include a plurality of rotor blades, wherein at least one of the rotor blades includes a folding mechanism for folding the at least one of the rotor blades for storage of the aircraft.

13. The aircraft as recited in claim 1,
wherein the first empennage and the second empennage shield corresponding ones of the first exhaust system and the second exhaust system from line of sight exterior of the aircraft.

14. The aircraft according to claim 1, wherein the first empennage supports a first stabilizer and a first rudder and the second empennage supports a second stabilizer and a second rudder.

15. The aircraft according to claim 14 further comprising:
a gap extending between the first empennage and the second empennage.

* * * * *